United States Patent
Haran

(10) Patent No.: US 10,736,144 B2
(45) Date of Patent: Aug. 4, 2020

(54) METHOD AND APPARATUS FOR V2X MULTICHANNEL OPERATION

(71) Applicant: AUTOTALKS LTD., Kfar Netter (IL)

(72) Inventor: Onn Haran, Bnei Dror (IL)

(73) Assignee: Autotalks LTD, Kfar Netter (IL)

( * ) Notice: Subject to any disclaimer, the term of this patent is extended or adjusted under 35 U.S.C. 154(b) by 0 days.

(21) Appl. No.: 16/294,082

(22) Filed: Mar. 6, 2019

(65) Prior Publication Data
US 2019/0320341 A1    Oct. 17, 2019

Related U.S. Application Data

(60) Provisional application No. 62/772,806, filed on Nov. 29, 2018, provisional application No. 62/658,092, filed on Apr. 16, 2018.

(51) Int. Cl.
| | |
|---|---|
| H04W 74/08 | (2009.01) |
| H04W 28/02 | (2009.01) |
| H04W 72/12 | (2009.01) |
| H04B 17/327 | (2015.01) |
| H04W 48/06 | (2009.01) |

(52) U.S. Cl.
CPC ...... *H04W 74/0816* (2013.01); *H04B 17/327* (2015.01); *H04W 28/021* (2013.01); *H04W 28/0236* (2013.01); *H04W 48/06* (2013.01); *H04W 72/1231* (2013.01)

(58) Field of Classification Search
CPC .................................................. H04W 74/0816
See application file for complete search history.

(56) References Cited

U.S. PATENT DOCUMENTS

| | | |
|---|---|---|
| 2006/0009232 A1 | 1/2006 | Vakil et al. |
| 2010/0046427 A1 | 2/2010 | Li et al. |
| 2015/0270913 A1* | 9/2015 | Li ........................ H04B 17/318 455/115.3 |
| 2016/0381571 A1 | 12/2016 | Koravadi et al. |
| 2017/0054204 A1 | 2/2017 | Changalvala et al. |
| 2017/0187435 A1 | 6/2017 | Carlou et al. |
| 2017/0290059 A1* | 10/2017 | Karaki ............. H04W 74/0816 |
| 2019/0045454 A1* | 2/2019 | Haran .................... H04W 76/15 |
| 2019/0053277 A1* | 2/2019 | Leinonen .............. H04W 24/10 |
| 2019/0296426 A1* | 9/2019 | Sohn ........................ H01Q 5/50 |
| 2020/0059962 A1* | 2/2020 | Tejedor .................. H04W 76/16 |

FOREIGN PATENT DOCUMENTS

| | | |
|---|---|---|
| WO | 2016115894 A1 | 7/2016 |
| WO | 2016155523 A1 | 10/2016 |

* cited by examiner

*Primary Examiner* — Jason E Mattis
(74) *Attorney, Agent, or Firm* — Nathan & Associates; Menachem Nathan

(57) ABSTRACT

Apparatus and methods that mitigate interferences between two vehicle-to everything (V2X) communications channels to maintain a sufficient communication range for both channels. A method comprises, in a V2X communication unit, detecting energy of an adjacent channel, or current and future scheduled transmission in the adjacent channel, if available, the adjacent channel being adjacent to a main channel, and if adjacent channel transmission is detected, deferring transmission in the main channel to maintain a sufficient communication range for both the main channel and the adjacent channel.

4 Claims, 10 Drawing Sheets

KNOWN ART

KNOWN ART

METHOD AND APPARATUS FOR V2X MULTICHANNEL OPERATION

CROSS-REFERENCE TO RELATED APPLICATIONS

This application is related to and claims priority from U.S. Provisional Patent Applications No. 62/658,092 filed Apr. 16, 2018 and 62/772,806 filed Nov. 29, 2018, both applications expressly incorporated herein by reference in their entirety.

FIELD

Embodiments disclosed herein relate in general to vehicle-to-everything (V2X) communications, and in particular to apparatus and methods for minimizing interferences between multiple adjacent V2X channels operating concurrently.

BACKGROUND

V2X promises to increase the level of vehicle safety by enabling reliable and early alerts of dangerous situations. The V2X band (5.9 GHz) includes three channels in Europe totaling 30 MHz, and seven channels in the US totaling 70 MH. The expansion of the usage of V2X services through the activation of more V2X channels is needed to support additional connectivity services, like vehicle to infrastructure (V2I) or automated driving. This needs to be done while assuring that the V2X safety channel communication range is not degraded. As used hereinbelow, "communication range" refers to distance between two communication devices or units.

DSRC (Dedicated Short Range Communication), specified by the IEEE802.11p standard and its upper layer coordination standard IEEE1609.4, ignores the mutual interferences between different channels (i.e. channels using the same 70 MHz band in the US or the same 30 MHz band in Europe). C-V2X is a competing V2X specification, defined by 3GPP. In C-V2X, transmissions are in pre-scheduled timeslots, without checking if any other transmission is currently taking place in same channel or other channels. If allowed for usage, it will share the same band. C-V2X supports multi-user allocation.

The impact of mutual interferences between two channels on the communication range can be explained using simulations. FIG. 1A illustrates a layout of three simulated vehicles, a first vehicle 102, a second vehicle 104 and a third vehicle 106. Vehicle 102 has two receivers R1 and R1 receiving respectively in channels Ch.A and Ch.B. Vehicle 104 has a transmitter T1 transmitting in Ch.A, and vehicle 106 has a transmitter T2 transmitting in Ch.B. Transmitters T1 and T2 transmit concurrently. FIGS. 1B and 1C show simulations of the impact of mutual interferences between two channels Ch.A and Ch.B on the communication ranges. The simulations were performed with the following parameters/conditions: urban environment; WINNER II path-loss model for line of sight (LOS); MCS2 (QPSK R=1/2); target Signal to Noise Ratio (SNR)=6 dB; adjacent channel rejection (ACR)=25 dB and co-adjacent rejection=39 dB (enhanced sensitivity); receiver noise figure: 9 dB; mask C; transmission power=20 dBm.

The horizontal (e.g. X) axis in each of FIGS. 1B and 1C represents the distance d1 112 of transmitter T1 in vehicle 104 from receiver R1 in vehicle 102. The vertical (e.g. Y) axis in each represents the distance d2 114 of transmitter T2 in vehicle 106 from receiver R2 in vehicle 102. Monochromatic grey represents a no-reception zone. The darker grey with changing tone represents zone of reception. It can be seen that the reception of the first channel fails when the second channel transmitter is close to the receiver, while the first channel transmitter is further away. For example, in FIG. 1A, when d2 is less than 30 m, Ch.A reception will fail for distances d1 greater than 150 m. As a result, the communication range is decreased. Here and below, the terms "first" and "second" with respect to channels are used in the context of channels inside a vehicle.

The interference problem is illustrated using a network simulation with a layout shown in FIG. 2A. Vehicles 201-280 are placed 25 meters apart on a two-lane road. Each vehicle has two transmitters and two receivers, assigned to different channels. The two transmitters work independently. Simulation results are shown in FIGS. 2B and 2C. FIG. 2B shows the communication range when two channels in the network are adjacent, and FIG. 2C shows the communication range when the two channels are co-adjacent. To clarify, adjacent channels are allocated sequentially. No guard separates between the end of one and the start of the other. Co-adjacent channels are separated by at least one channel. FIGS. 2B and 2C show histograms where the X-axis represents the communication range in meters and the Y-axis represents occurrences of the recorded communication range at each distance. The simulated vehicle network model applies a two-ray channel model, transmission power of +23 dBm, receive sensitivity of −95 dBm, and channel load of 20% in Ch.A and 40% in Ch.B. The overall (total) number of transmissions in the simulation is 4000. The adjacent channel rejection follows the enhanced values of IEEE802.1p, which are 25 dB for adjacent and 39 dB for co-adjacent. In both the adjacent and co-adjacent cases, the communication range of a vehicle is decreased due to interference from concurrent adjacent channel transmission of another vehicle. The communication range without adjacent channel rejection is above 400 m. Interferences decrease the communication range. The histogram occurrences in each communication range are added up to a given distance, for example up to 200 m, 300 m and 400 m. For example, in FIG. 2A, the communication range drops below 300 m in 1086 transmissions, which is ~27% of the total transmissions. The communication range drops below 200 m in 856 transmissions, which are ~21% of the total transmissions.

The mutual interference may be between a DSRC channel and another DSRC channel or between a DSRC channel and a C-V2X channel.

A high percentage of dropped messages at short distances (e.g. 200 m and 300 m) from the transmitting vehicle are unsatisfactory for safety operation. There is therefore a need for, and it would be advantageous to have apparatus and methods to mitigate (reduce) interferences in transmission and/or reception (also referred to as "usage") between DSRC channels or between DSRC and C-V2X channels beyond the known art.

SUMMARY

Embodiments disclosed herein relate to apparatus and methods that mitigate interferences of a first DSRC channel with a second DSRC channel or a C-V2X channel to maintain a sufficient communication range for both channels. In this description, a "sufficient communication range" may be for example 200 meters. The potential receive or transmit range of a first channel is increased by deferring the transmission in a second, adjacent channel, until the first channel stops transmitting. The essence is to defer transmission in a second channel if such DSRC transmission shortens the range of ongoing communication in a first adjacent channel (either DSRC or C-V2X), where communication does not necessarily involve the same unit. The deferral is based on detecting the occurrence of the adjacent channel reception (in the DSRC case) or using current and next resource allocation (in the C-V2X case) and deferring the communication until reception in an adjacent channel is no longer detected or allocated.

In exemplary embodiments there are provided V2X communication units, each unit comprising an enhanced PHY module that includes an adjacent channel energy detection module operative to detect ongoing transmission in the adjacent channel based on energy, the adjacent channel being adjacent to a main channel, and an enhanced MAC module that includes a transmission deferral module operative to receive an adjacent channel energy value detected by the adjacent channel energy detection module, and, based on a comparison of the received adjacent channel energy value with a detection threshold, operative to defer transmission in the main channel to maintain a sufficient communication range for both the main channel and the adjacent channel. The adjacent channel may be either a left adjacent channel or a right adjacent channel relative to the main channel.

In an exemplary embodiment, the main channel and the adjacent channel are DSRC channels.

In an exemplary embodiment, the adjacent channel energy detection module includes a filter bank used to estimate energy at different frequencies within the main channel based on time sample inputs, and an adjacent energy analyzer for detecting the adjacent channel and its energy based on the estimated energy at different frequencies and for outputting an adjacent CCA value.

In an exemplary embodiment, the adjacent channel energy detection module is operative to detect ongoing transmission in the adjacent channel based on energy by detecting an adjacent channel transmission mask at the energy of the main channel.

In an exemplary embodiment, the transmission deferral module includes a mechanism to override the CCA value when the transmission in the main channel will cause interference to an adjacent channel.

In exemplary embodiments, there are provided V2X communications units comprising an enhanced a MAC module that includes a transmission deferral module operative to receive and process an input related to an adjacent channel, wherein the input includes current and next C-V2X allocations and their past RSSI values, and, based on the input, operative to defer transmission in a main channel to maintain a sufficient communication range for both the main channel and the adjacent channel.

In an exemplary embodiment, the main channel is a DSRC channel and the adjacent channel is a C-V2X channel.

In an exemplary embodiment, the transmission deferral module is further operative to receive an input of time till next C-V2X slot and an input of pending packet length, and to use these inputs in a decision to defer the transmission in the main channel.

In exemplary embodiments, there are provided methods comprising: in a V2X communication unit, detecting energy of an adjacent channel, the adjacent channel being adjacent to a main channel, and, if adjacent channel energy is detected, deferring transmission in the main channel to maintain a sufficient communication range for both the main channel and the adjacent channel. In some embodiments, the main channel and the adjacent channel are DSRC channels. In some embodiments, the main channel is a DSRC channel and the adjacent channel is a C-V2X channel.

In an exemplary embodiment, the detecting energy of an adjacent channel includes detecting an adjacent channel transmission mask by finding a correlation between a pattern of an adjacent channel mask and an energy of the main channel.

In an exemplary embodiment, the deferring transmission in the main channel includes overriding a CCA value when the transmission in the main channel will cause interference to the adjacent channel.

In an exemplary embodiment, if adjacent channel energy was falsely detected, then the deferring transmission in the main channel includes skipping a backoff scheme upon end of false detection of the adjacent channel.

In an exemplary embodiment, the detecting energy of an adjacent channel includes using a filter bank used to estimate energy at different frequencies within the main channel based on time sample inputs, and using the estimated energy at different frequencies to detect the adjacent channel energy.

In an exemplary embodiment, there is provided a method, comprising: in a V2X communication unit in which communications occur in a main channel and in an adjacent channel, receiving an input related to the adjacent channel, the input including current and next C-V2X allocations and their past RSSI values, processing the input, and, based on the processed input, and deferring transmission in the main channel to maintain a sufficient communication range for both the main channel and the adjacent channel.

In an exemplary embodiment, the method further comprises receiving an input of time till next C-V2X slot and an input of pending packet length, and using these inputs in a decision to defer the transmission in the main channel.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals.

DETAILED DESCRIPTION

In various embodiments, there are disclosed apparatus and methods that enable V2X multi-channel concurrent operation in adjacent bands without interferences.

Assume the following scenario: in the V2X band there are two or three channels, a main channel and an adjacent channel at its right side and/or at its left side. Here and below, the term "main" with respect to channel is used to identify the channel that a unit is operative at, with "adjacent" referring to a channel next to the main channel.

A V2X communication unit (e.g. transmitter/receiver or "TX/RX") also referred to herein as "V2X communication device", needs to transmit. Each vehicle includes one or two transmitters like T1 and T2 above and two receivers like R1 and R2 above. The adjacent channels may be for example channels Ch.A and Ch.B above. The transmission may decrease the communication range of other V2X communication units currently receiving messages in one of the adjacent channels. According to embodiments of disclosed apparatus and methods, the main channel transmission can be and is deferred until the transmission will not interfere with adjacent channels.

Figure 3A:
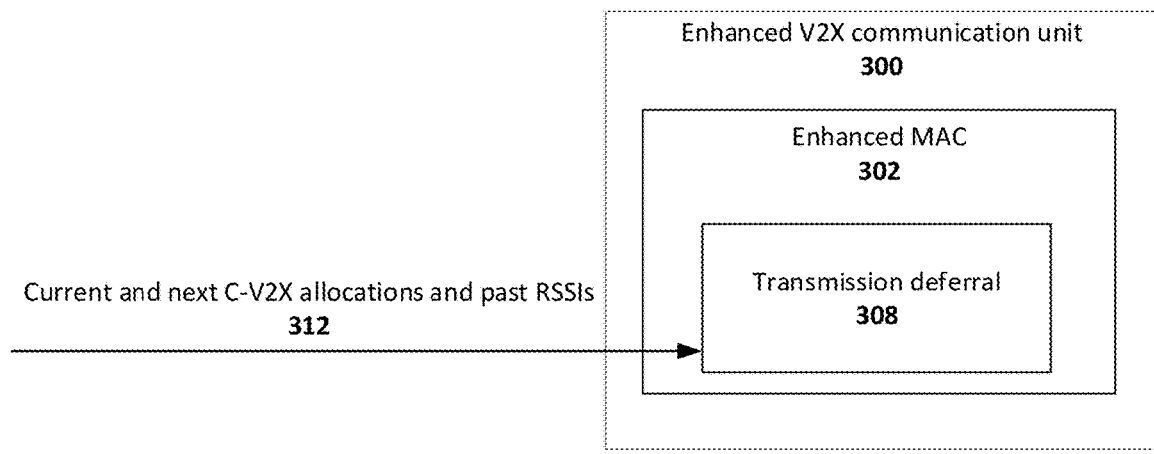
FIG. 3A illustrates a system diagram of a first embodiment of V2X communication device capable of co-channel mitigation disclosed herein.
Figure 3B:
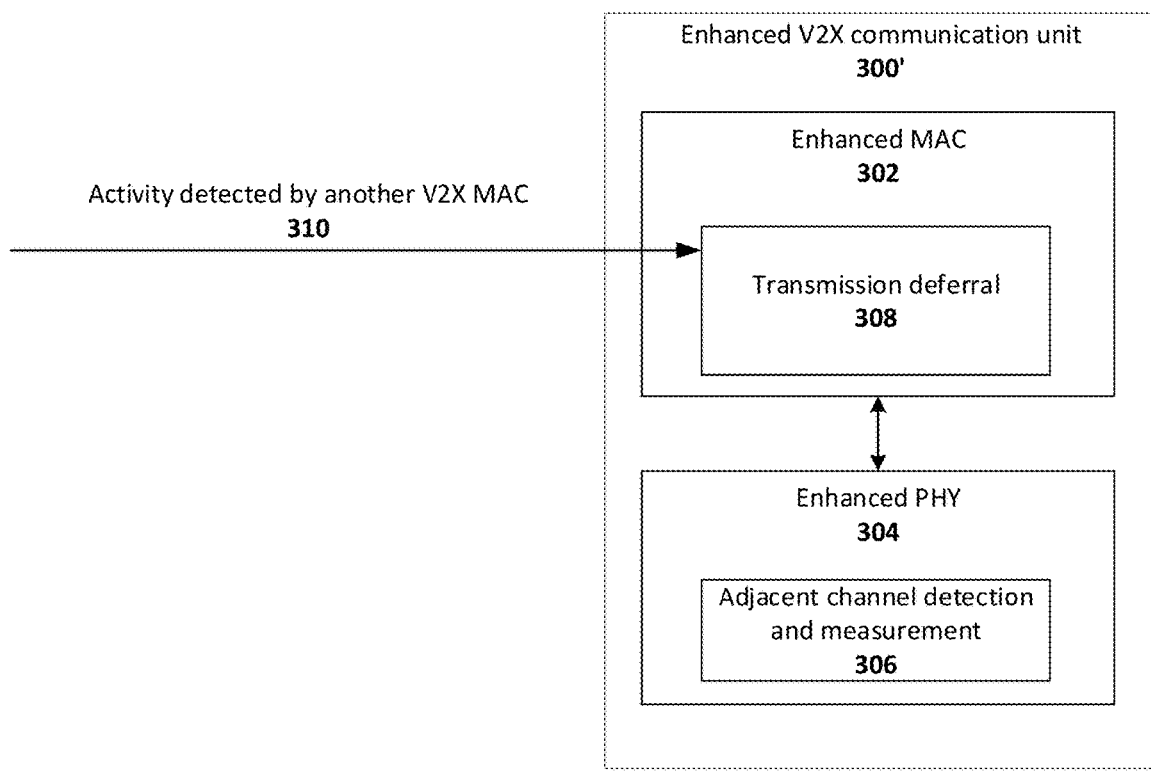
FIG. 3B illustrates a system diagram of a second embodiment of a V2X communication device capable of co-channel mitigation disclosed herein.

FIG. 3A illustrates a system diagram of a first embodiment of a 802.11 enhanced V2X communication unit numbered 300 for transmission deferral to mitigate interferences according to an exemplary embodiment disclosed herein. Unit 300 is "enhanced' in the sense that they comprise an enhanced media access controller (MAC) module 302 in addition to a regular (known) PHY module (not shown). MAC module 302 is "enhanced" in its capabilities vs. known MAC modules in that it includes a transmission deferral module 308, the functionalities of which are described below. Enhanced MAC module 302 is used in methods for mitigating interferences of a DSRC channel with a C-V2X channel to maintain a sufficient communication range for the DSRC and V-C2X channels. FIG. 3B illustrates a system diagram of a first embodiment of a 802.11 enhanced V2X communication unit numbered 300' for transmission deferral to mitigate interferences according to an exemplary embodiment disclosed herein. In addition to the components (i.e. enhanced MAC module 302) of unit 300, unit 300' comprises an enhanced PHY module 304, "enhanced" in its capabilities vs. known PHY modules in that it includes an adjacent channel energy detection module 306 (see more details in FIG. 4A) which is operative to detect and measure the energy of the adjacent channel. Enhanced PHY module 304 is used in methods for mitigating interferences of a DSRC channel with another DSRC channel to maintain a sufficient communication range for both DSRC channels.

A vehicle may have a single DSRC channel implementing the enhanced V2X communication unit 300'. Vehicles having two channels are supported as well.

Figure 3C:
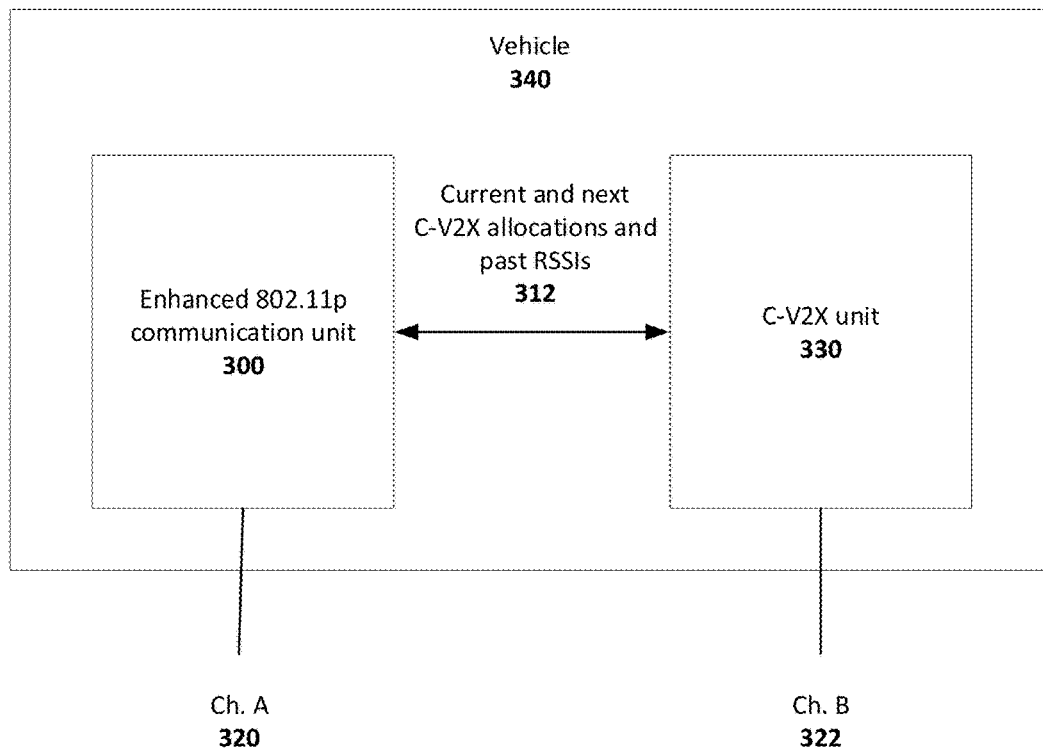
FIG. 3C illustrates a system diagram of a dual-channel vehicle communication system disclosed herein.

FIG. 3C illustrates a system diagram of one embodiment of a dual-channel vehicle communication system which uses an interference mitigation scheme as disclosed herein. A vehicle 340 includes a communication system supporting two channels, a DSRC channel 320 and a C-V2X channel 322. Channel 320 uses a communication unit 300, while channel 322 uses a C-V2X communications unit 330 that operates as described in the 3GPP specification. C-V2X unit 330 indicates to unit 300 the current and next C-V2X allocations and their past RSSI values via an interface 312.

Figure 3D:
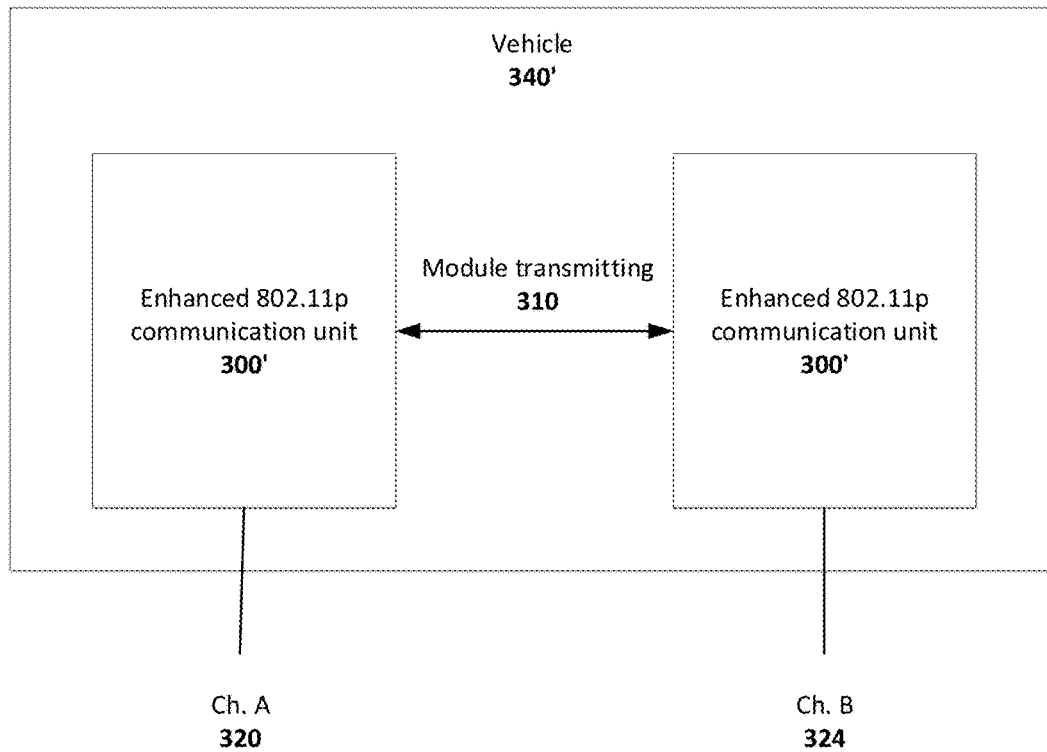
FIG. 3D illustrates another system diagram of a dual-channel vehicle communication system disclosed herein.

FIG. 3D illustrates a system diagram of another embodiment of a dual-channel vehicle communication system which uses an interference mitigation scheme as disclosed herein. A vehicle 340' supports two DSRC channels 320 and 324. Both channels 320 and 324 use a communication unit 300'. When either unit 300' transmits, it indicates its transmission to the other unit 300' via a module transmitting interface 310.

To clarify, processing of various inputs received in various units and/or modules described herein may be performed in a processing unit or "processor" (not shown). Such processors are common in various communication/electronic systems in vehicles, as well known.

Figure 4A:
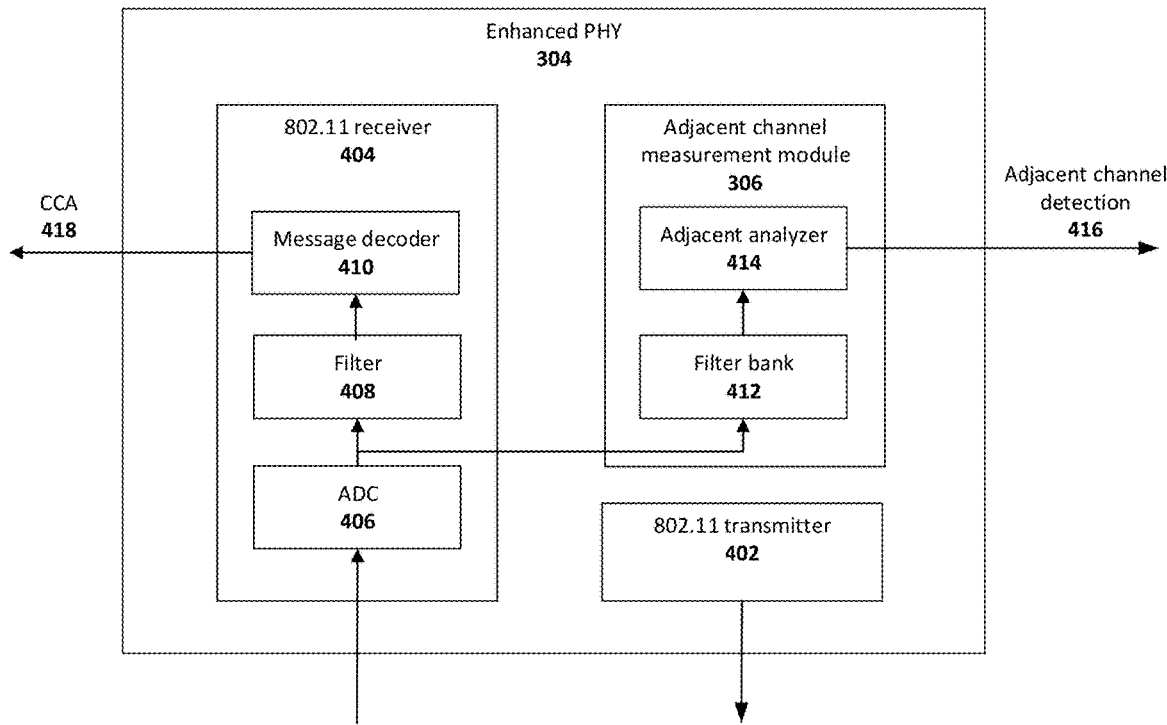
FIG. 4A shows a block diagram of an enhanced PHY module.

FIG. 4A shows a block diagram of enhanced PHY module 304, zooming on adjacent channel measurement functionality. Enhanced PHY module 304 includes, in addition to adjacent channel energy detection module 306, a legacy IEEE802.11 transmitter 402 and a legacy IEEE 802.11 receiver 404. Receiver 404 comprises an Analog-to-Digita3l Converter (ADC) 406, a filter 408 and a message decoder 410. ADC 406 samples demodulated RF signals that are fed into filter 408, which limits the signal to the expected signal bandwidth for eliminating interferences from adjacent channels and outputs time samples. Filter 408 feeds message decoder 410, which completes the reception chain as known in the art. CCA output (0 or 1) 418 indicates that the main channel is busy, and transmission should be deferred if the value is 1. Adjacent channel energy detection module 306 is fed the output (time samples) of ADC 406. The time samples enter a filter bank 412. The goal of the filter bank is to estimate energy at different frequencies within the channel. A common implementation for such filter is a fast Fourier Transform (FFT). The FFT does not serve the same purpose as in OFDM communications, where it converts subcarriers data to the time domain, since in this case the signal is assumed to be noise and the timing of the FFT is not synchronized with any symbol timing. Therefore, the FFT timing is arbitrary, and its length is not derived from the number of symbol subcarriers. For example, one can use a FFT with a length of 16. The filter bank results are fed into an adjacent channel analyzer 414 responsible for detecting ongoing transmission in the adjacent channel based on energy 416 see FIG. 9. The detection of ongoing transmission in the adjacent channel based on energy will be referred to henceforth simply as "adjacent channel energy detection", with the action being referred to as "detecting adjacent channel energy".

Figure 4B:
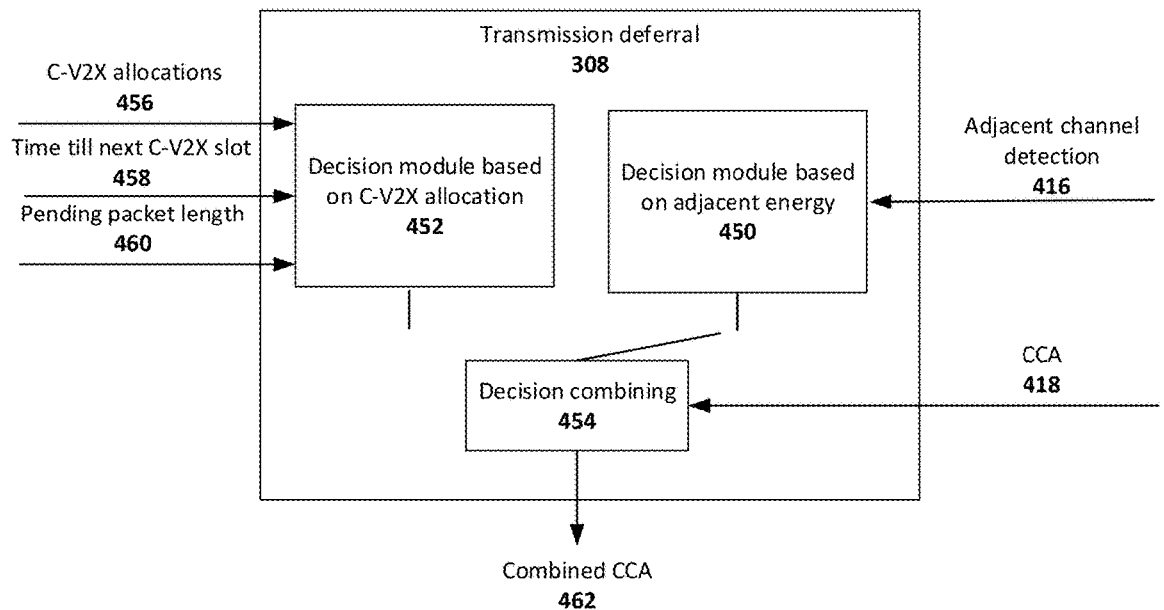
FIG. 4B illustrates a system diagram of a transmission deferral module.

FIG. 4B shows details of transmission deferral module 308. Module 308 includes a first decision module 450 for making a decision based on adjacent energy, a second decision module 452 for making a decision based on C-V2X allocations and a decision combining module 454. First decision module 450, used in DSRC channel interference mitigation schemes, receives a detected adjacent channel energy input 418 and an adjacent channel energy detection input 416 and once the adjacent channel energy is detected it defers the transmission, outputting a first request to defer transmission, see below. Module 450 measures the duration of adjacent channel energy detection based on input 418 to ignore false detections by skipping backoff procedure at the end of detection. Second decision module 452, used in C-V2X channel interference mitigation schemes, is fed three inputs: an input of upcoming C-V2X allocations 456, an input of time till next C-V2X slot 458, and an input of pending packet length 460, for deciding if the packet can fit into transmission without interfering with current or next C-V2X transmission. Second decision module 452 outputs a second request to defer transmission. The output (requests to defer transmission) of either module 450 or 452 is combined in decision combining module 454 with an appropriate external input to provide a combined CCA value 462, which is set when one or both of outputs 450 and 452 request to defer transmission. In other words, the transmission is deferred based on the combined CCA value.

In use in an example, adjacent channel energy detection module 306 in a unit 300 detects and measures adjacent channel energy, and if such energy is detected, then transmission in the main channel is deferred. Transmission deferral module 308 receives the energy value measured by adjacent channel energy detection module 306, compares the measured energy to a detection threshold and if the energy exceeds the threshold, the transmission is deferred in a manner similar to that in a Clear Channel Assessment (CCA) method, as explained in more detail with reference to FIG. 5. In addition, enhanced MAC module 302 may optionally receive an indication of activity of a second channel, as detected by a V2X MAC input 310, typically arriving from a second enhanced MAC module 302 in a second unit 300 tuned to the second channel. Optionally, when the second channel is C-V2X and not DSRC, "current and next C-V2X resource allocations" (an input defining the vehicles currently transmitting and about to transmit in a next slot along with their historical RSSI values) is made available through interface 312 by a C-V2X communication unit 330 operating in the second channel for co-existence interference mitigation with C-V2X.

Interface 312 may receive and transfer a plurality of variables, for example:

a) a list of all vehicles (also referred to sometimes as "stations") currently allocated (i.e. scheduled for transmission now and in the next 1 ms slot);

b) RSSI values of all currently allocated stations as recorded in their previous transmission;

c) a list of all stations allocated in next slot;

d) RSSI values of all allocated stations allocated in next slot as recorded in their previous transmission.

Figure 5:
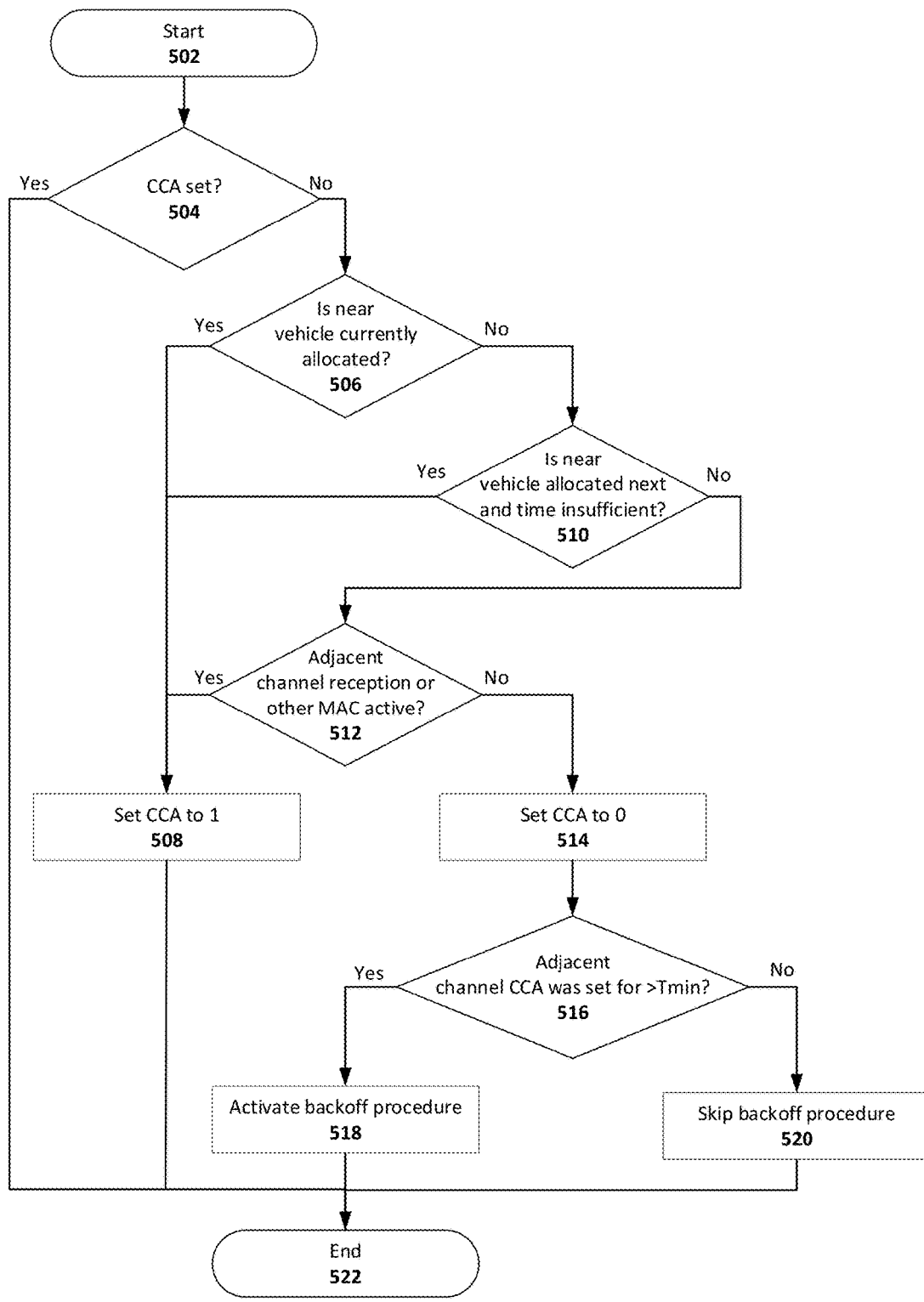
FIG. 5 illustrates a flow chart of transmission deferral based on adjacent channel activity.

A flow chart of actions taken by transmission deferral module 308 is shown in FIG. 5. The flow chart is executed for each channel in a self vehicle. In some cases, a self vehicle may have only one, main channel. Operation starts at step 502. A check is made in step 504 if the CCA is set, as defined by the current IEEE 802.11 specification for indicating activity in same channel. If yes, operation ends at step 522 as packet transmission has to be deferred according to IEEE 802.11 rules regardless of adjacent channel activity. If no, a C-V2X mitigation check is performed based on the input received through interface 312. Step 506 checks if a neighbor vehicle is currently allocated for transmission. In C-V2X, each device (V2X communication unit) knows the full allocation of planned transmission in advance. Since reception energy was previously measured, the proximity distance of the allocated vehicle from the self vehicle is known. Each vehicle requests its allocation using a special message. The energy of allocation request can indicate if the vehicle is near or far. In case multiple vehicles are allocated in the same slot, all vehicles are checked, and even if a single one of the vehicles is closer than the required interference-free communication range, the transmission has to be deferred. If such allocation exists, operation continues from step 508, where CCA is set to 1 and from there to end 522. If no neighbor is currently allocated, a check is performed in step 510 to check if the neighbor is allocated in the next C-V2X slot and if time would be sufficient to complete packet transmission. As mentioned, C-V2X transmissions occur in 1 ms slots with one transmission per slot, thus the time till the next transmission is known. The duration of the DSRC packet pending transmission is known as well, by dividing the packet length by the transmission rate and adding packet overhead. Therefore, it is possible to compare the time till next C-V2X transmission with packet duration and know if the time is sufficient. For example, a packet of 300 bytes transmitted at 6 Mbps can be transmitted only if the time till the next C-V2X allocation is greater than 4480 (adding 480 overhead). If transmission is possible, operation continues from step 508. Otherwise, operation continues from step 512".

The DSRC mitigation is performed next in steps 512-520. Adjacent channel reception is checked in step 512. If energy is detected, or if input 310 indicates activity by another MAC unit, operation continues from step 508, where the CCA is set to 1. If the check of step 512 yielded no energy detection, CCA is set to 0 in step 514. A check is made in step 516 if the adjacent channel CCA was set for more than Tmin. Tmin may be for example 16 µs. If the answer is Yes, then operation continues from step 518, where an IEEE 802.11 backoff scheme is activated to prevent many devices to try to occupy the channel at the same time. If the answer in step 516 is No, meaning the adjacent channel CCA was set for less than Tmin, then operation continues from step 520, where the backoff scheme is skipped. This is done as to punish the device with further delay as the adjacent channel CCA was probably raised by mistake. Both 518 and 520 lead to end 522.

Figure 1A:
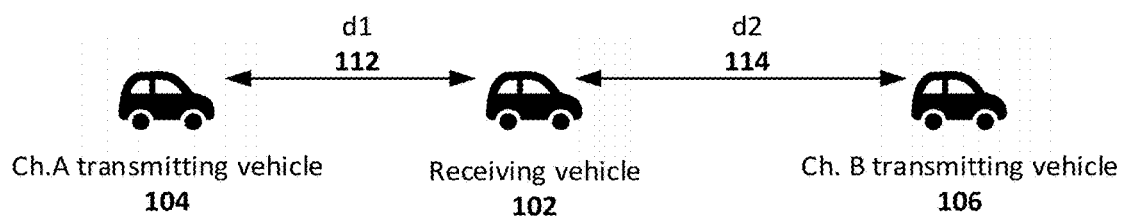
FIG. 1A illustrates a layout of simulated vehicles.
Figure 1B:
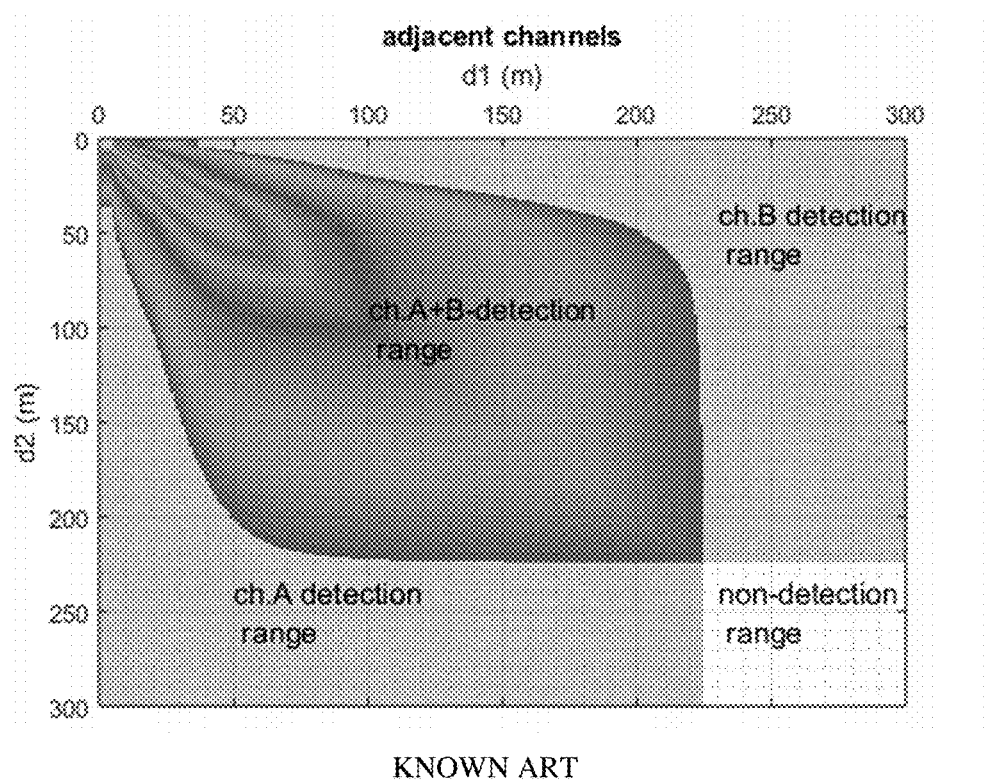
FIG. 1B illustrates simulated adjacent channel energy detection ranges.
Figure 1C:
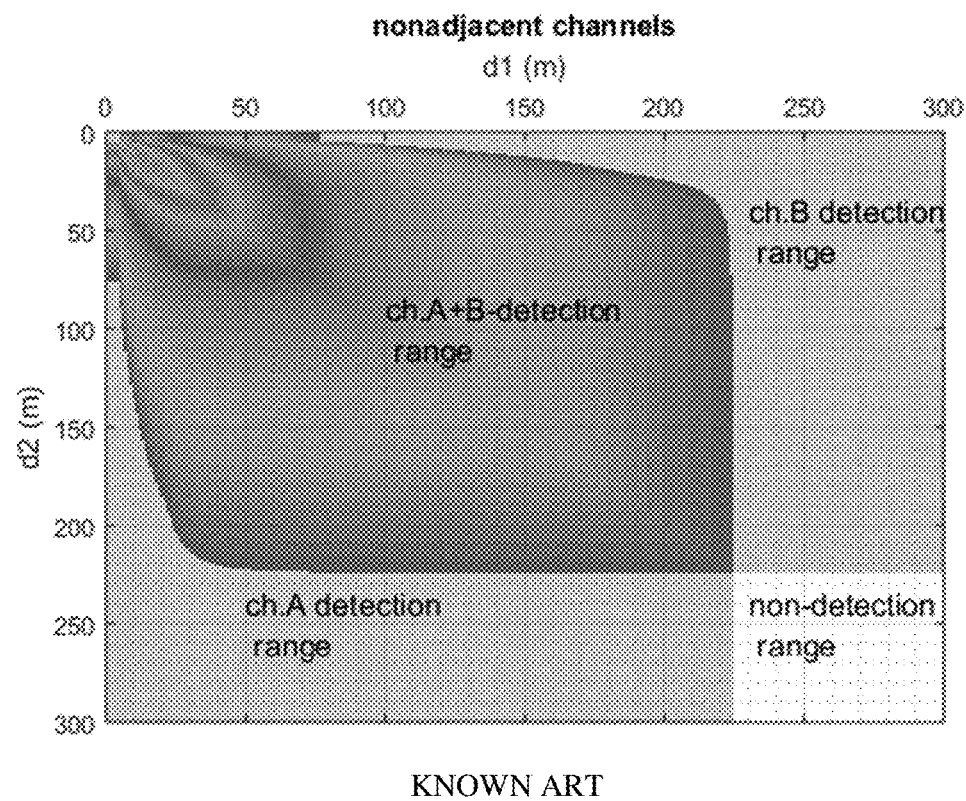
FIG. 1C illustrates simulated co-adjacent channel energy detection ranges.
Figure 2A:
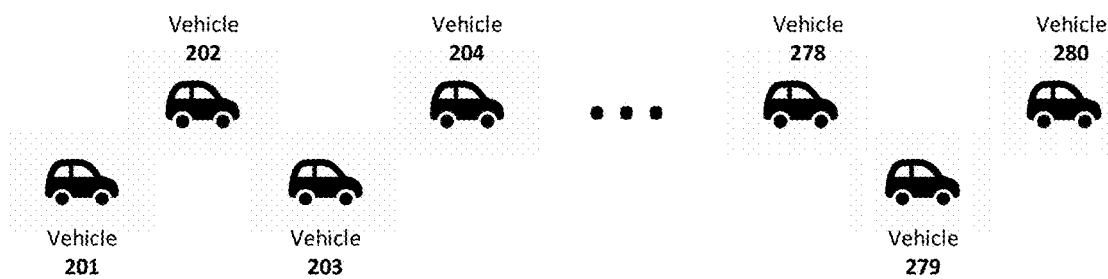
FIG. 2A illustrates a layout of vehicles for network simulation.
Figure 2B:
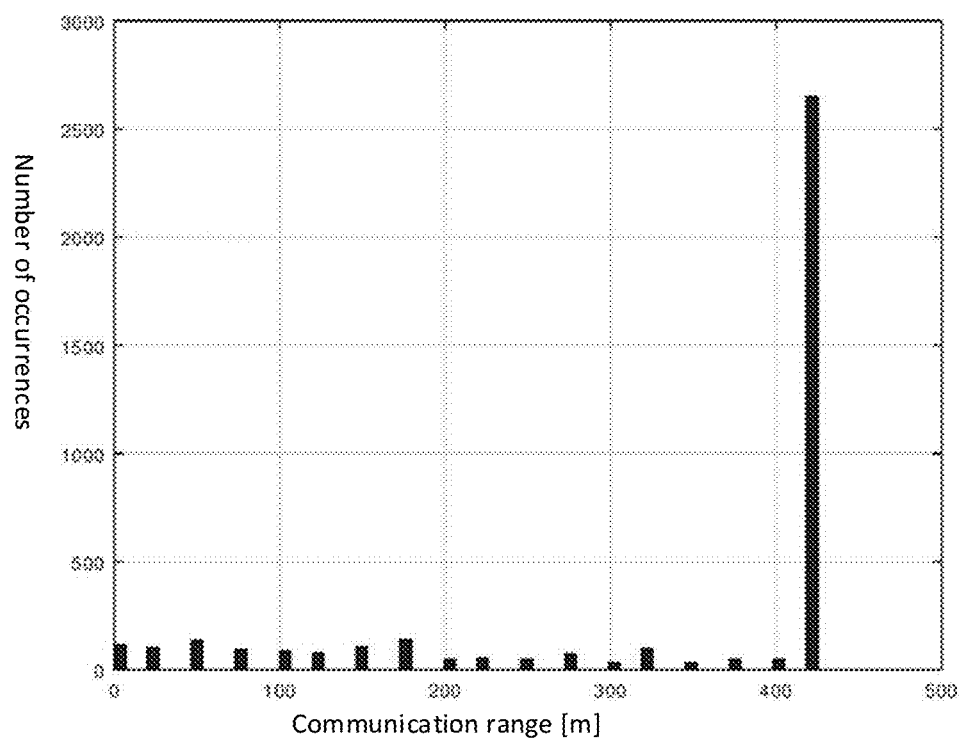
FIG. 2B illustrates network simulated communication range with two adjacent channels.
Figure 2C:
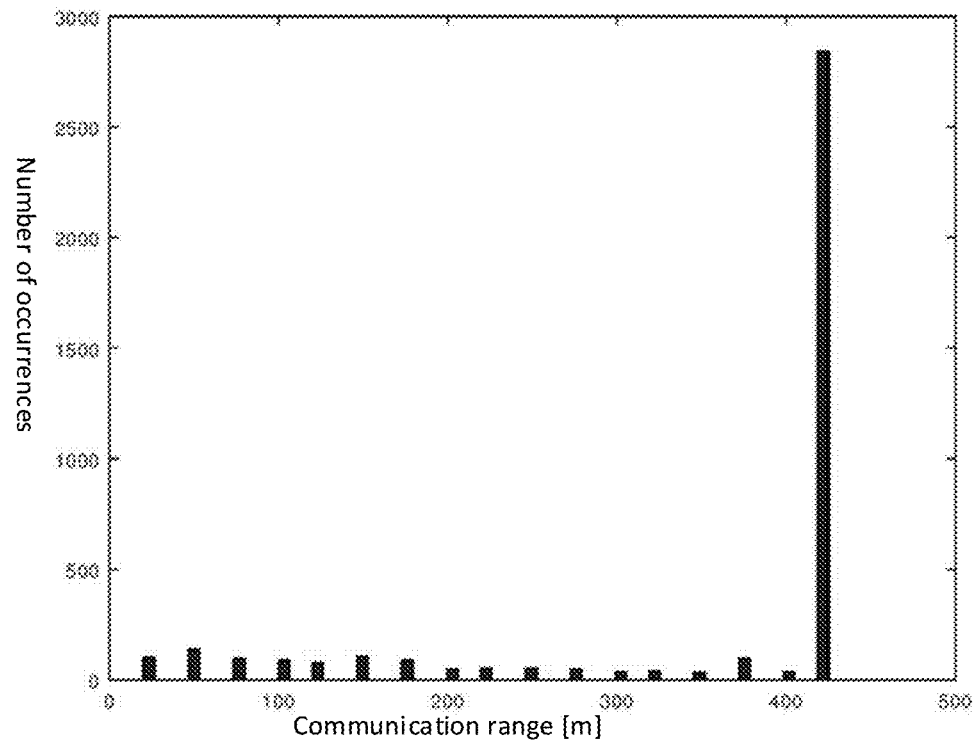
FIG. 2C illustrates network simulated communication range with two co-adjacent channels.
Figure 6A:
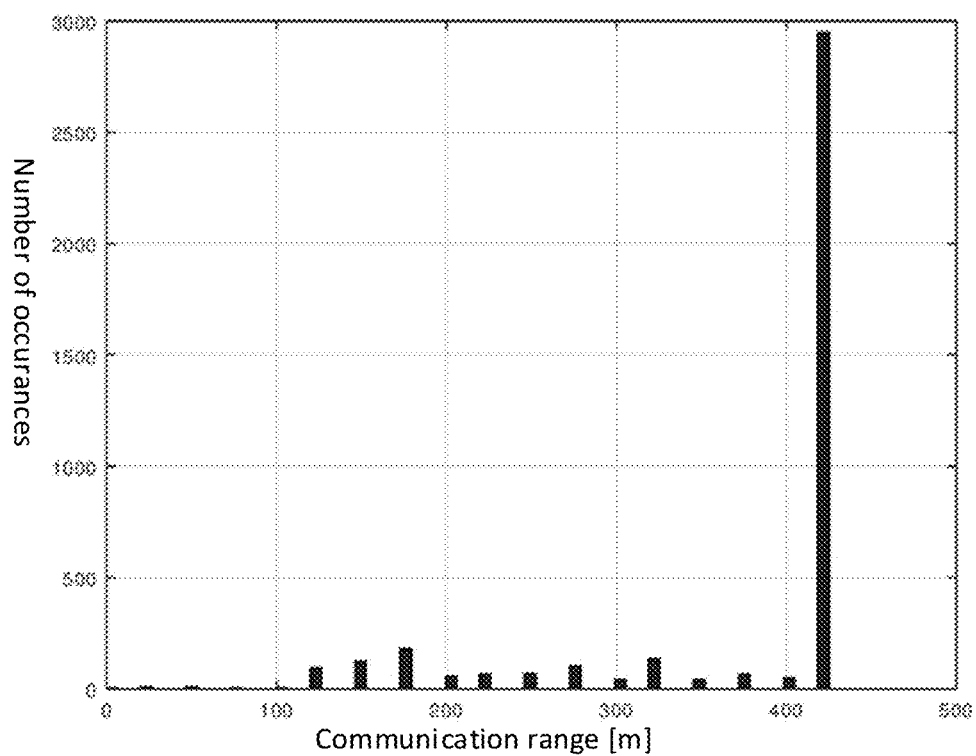
FIG. 6A illustrates a network simulated communication range with two adjacent channels with mitigation using −62 dBm detection threshold.
Figure 6B:
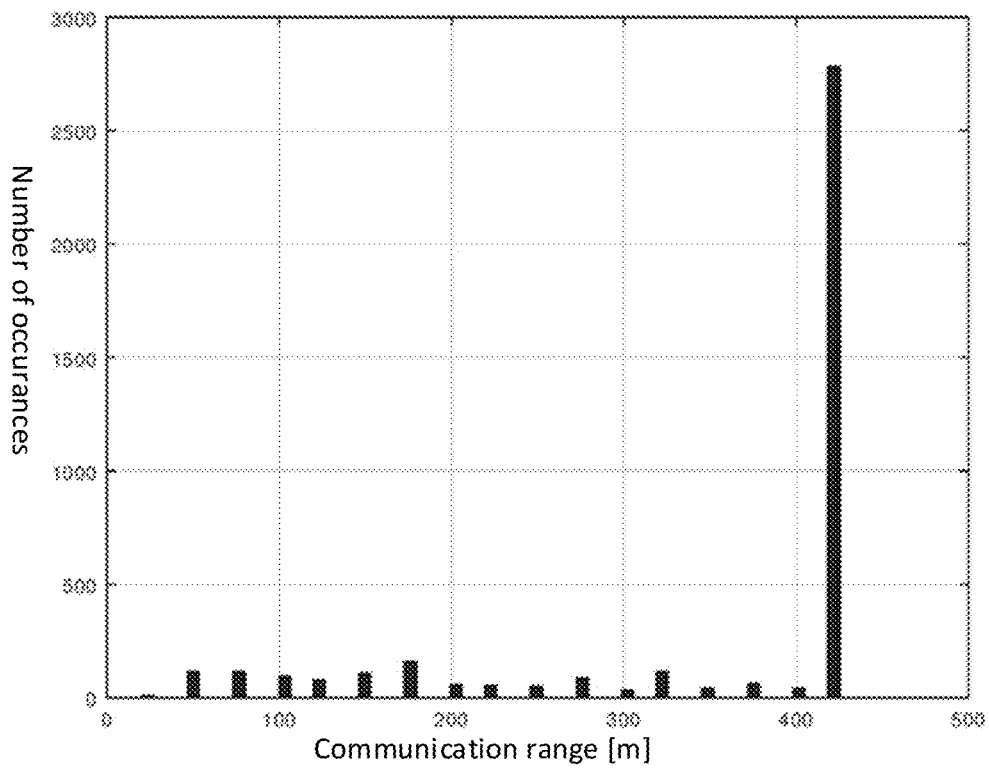
FIG. 6B illustrates a network simulated communication range with two adjacent channels with mitigation using −72 dBm detection threshold.

To show the effect on interference mitigation, the network simulation of FIG. 2 is retested with the new mitigation scheme. FIG. 6A shows the results when detection of −62 dBm adjacent channel energy defers transmission. FIG. 6B shows the results when detection of −72 dBm adjacent channel energy defers transmission. The results of the mitigation scheme for these detection thresholds and others are summarized in Table 1:

TABLE 1

| Scheme | Failures <100 m | Failures <200 m | Failures <300 m |
|---|---|---|---|
| No mitigation | 11.2% | 21.4% | 27.1% |
| −62 dBm adjacent channel energy detection threshold | 5.7% | 16.9% | 23.1% |
| −67 dBm adjacent channel energy detection threshold | 3.2% | 15.1% | 22.1% |
| −72 dBm adjacent channel energy detection threshold | 0.5% | 10.6% | 17.9% |
| −77 dBm adjacent channel energy detection threshold | 0.4% | 5.6% | 13.7% |

TABLE 1-continued

| Scheme | Failures <100 m | Failures <200 m | Failures <300 m |
|---|---|---|---|
| −82 dBm adjacent channel energy detection threshold | 0.4% | 0.6% | 9.5% |

The simulation provides a simulated transmission latency, which indicates how much time a packet waits before transmission. The transmission latency is similar in all thresholds. No degradation is noticed.

From Table 1, the mitigation scheme is proven to be effective and required for reliable usage of adjacent channels. Co-adjacent channels transmission impacts mostly the transmitting vehicle itself, and mitigation can be localized, i.e. not based on detection of adjacent channel activity, but based on indication from the second unit located in the same vehicle and handling the other channel, as provided through interface 310.

A lower adjacent channel energy detection threshold increases the protected distance. The threshold is derived by the PHY module ability to reliably detect and measure adjacent channel energy. The target value is set as −72 dBm, which is typically the measured power at 200 meters from a transmitter in line-of-sight condition.

Figure 7:
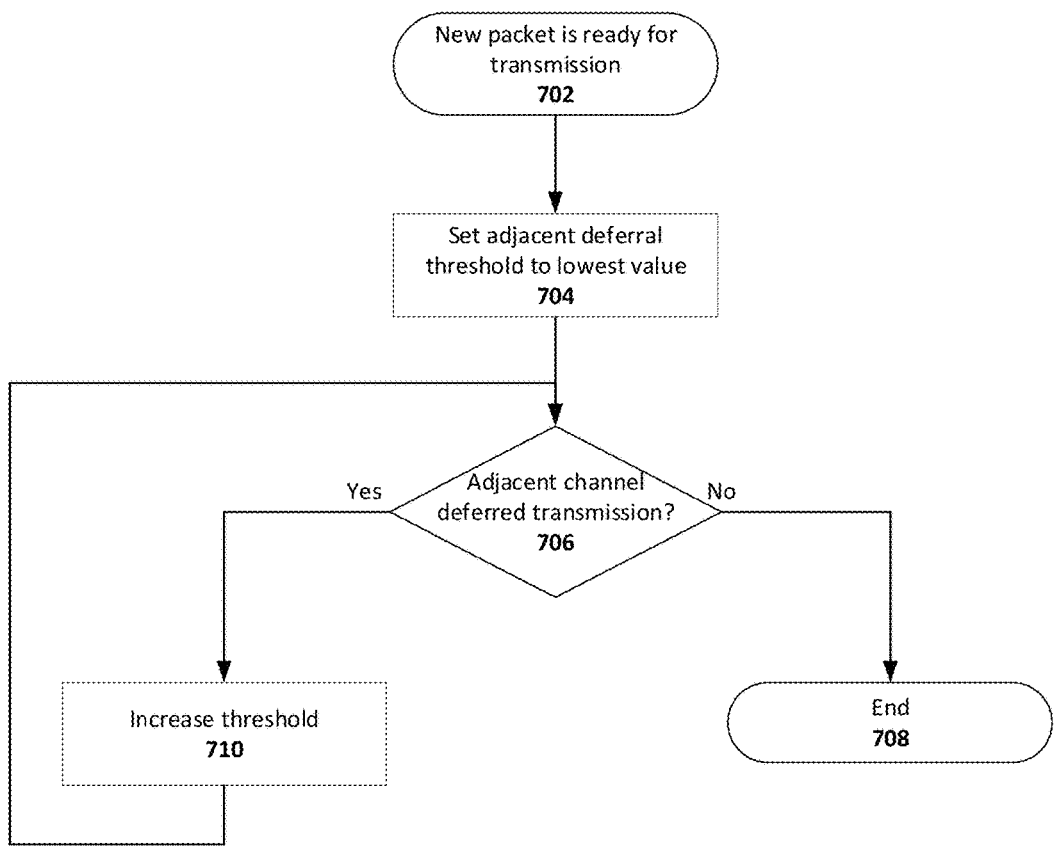
FIG. 7 illustrates a flow chart for setting dynamically the detection threshold.

Although the latency was not harmed in the simulation, FIG. 7 describes in a flow chart an example of a method that ensures bounded latency. The method lowers the detection threshold upon any transmission deferred due to adjacent channel energy such that the communication range free from interference is decreased. Threshold lowering decreases the potential number of vehicles of which transmission in adjacent channel can cause transmission deferral. This means the number of deferral events is limited, and the latency of given transmission is bounded. Operation begins at step 702 when a new packet is ready for transmission. The adjacent channel energy detection threshold is set to a lowest value (for example −72 dBm) at 704 for achieving the longest communication range (i.e. best protection). Step 706 checks if the adjacent channel deferred transmission. If No, operation ends at 708. If Yes, the detection threshold is increased in step 710, followed by returning to step 706. For example, the initial threshold set to −72 dBm is increased to −67 dBm and further to −62 dBm until transmission is successful.

Figure 8:
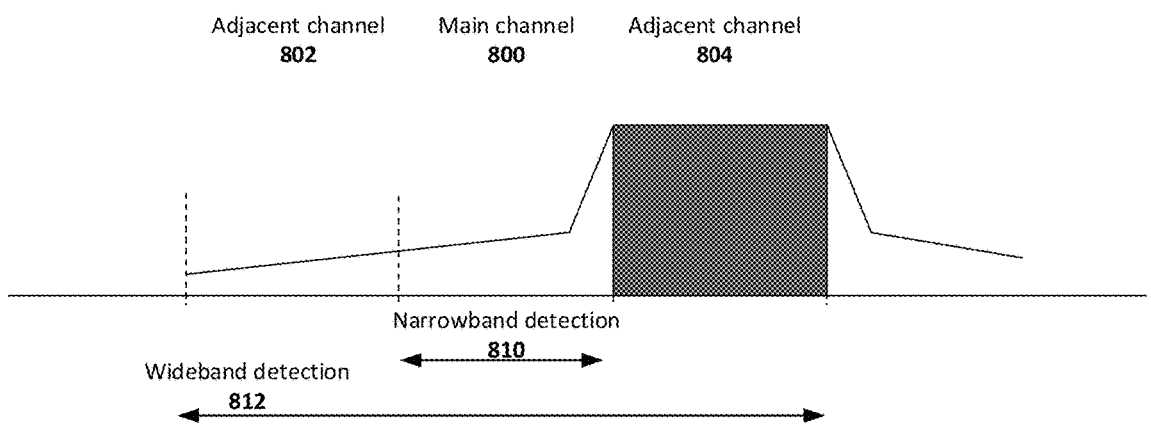
FIG. 8 illustrates a definition of adjacent channel measurement schemes.

FIG. 8 illustrates a definition of adjacent channel energy detection schemes. The receiver is tuned to a main channel 800, while another unit is transmitting at the right adjacent channel 804. The left adjacent channel, 802, is idle. The signal observed in channels 800 and 802 is only the transmission mask of the signal transmitted in channel 804. The adjacent channel energy detection is referred to the main channel 800. Two adjacent channel energy detection schemes are defined: a narrowband detection scheme 810, where only data available at the main channel is used for adjacent channel signal classification and measurement, and a wideband detection scheme 812, where data is available beyond the main channel.

Figure 9:
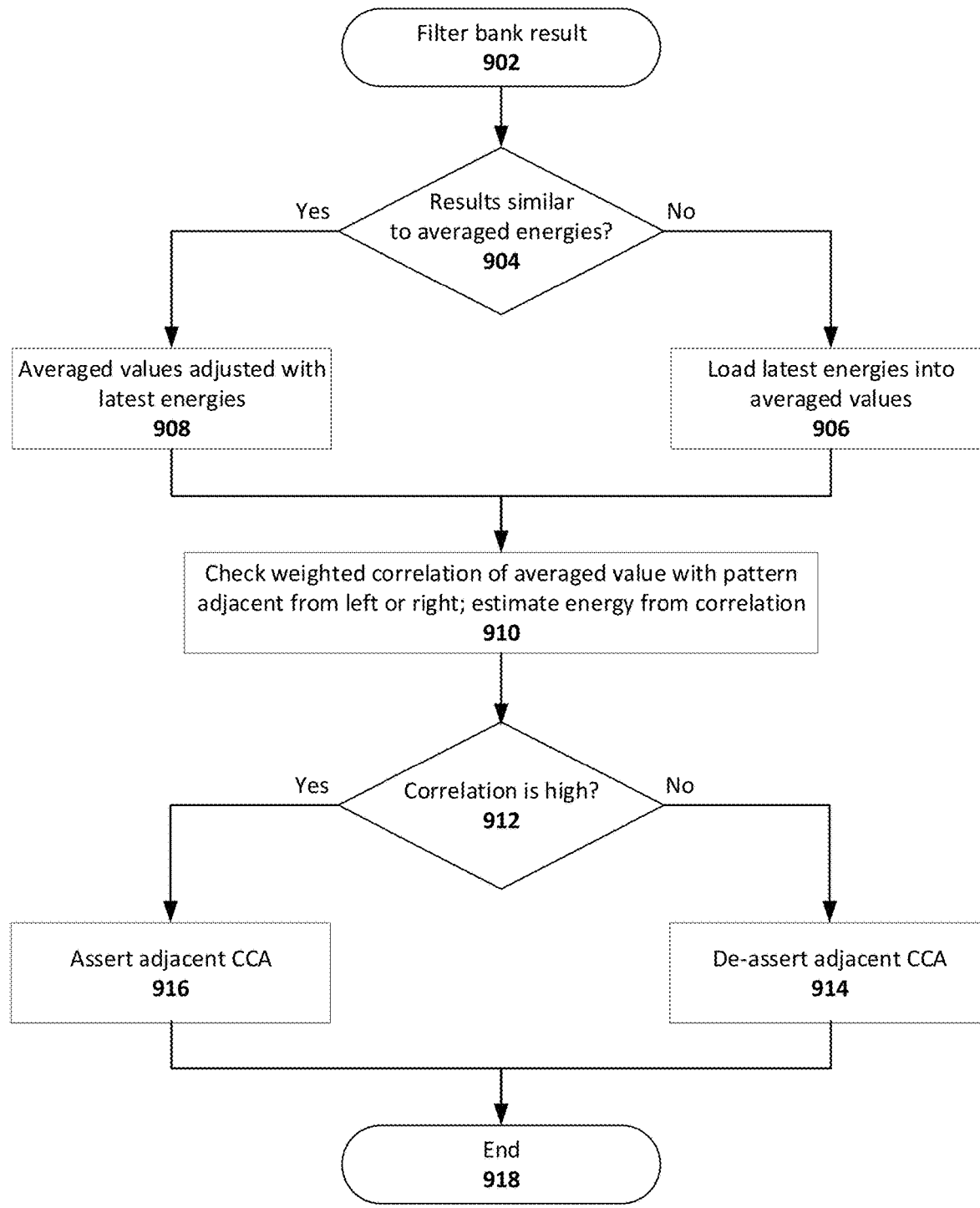
FIG. 9 illustrates in a flow chart the operation of the adjacent channel analyzer.

FIG. 9 illustrates in a flow chart the operation of adjacent channel energy analyzer 414 in a narrowband detection scheme. Operation starts at 902 once filter bank results are available. The similarity between the new results and averaged energies of the main channel, which reflect the transmission mask of the adjacent channel, is checked in 904. To clarify, "averaged energies" is a variable that tracks the filter bank output over time. A change in received data, when a packet transmission in main or adjacent channels starts or ends, causes the "averaged energies" to reset and to use the last received value as is. Similarity may be broken as a result of transmission start or end in one of the adjacent channels, calling for obsolescence of the averaged energies. Similarity is declared if all energies, both new and averaged, are within a certain similarity threshold, for example 6 dB. If in check 904 the new results are not similar to the averaged energies, then operation continues to step 906. In step 906, the new value of filter bank 412 output is loaded into the averaged energies value, overriding the previous value. If in check 904 the results are similar, then operation continues to step 908, where averaged energies values are adjusted using latest values and using for example an alpha filter. With that, the noise is averaged, and the adjacent channel transmission mask is better discovered. That is, the pattern of adjacent channel transmission as reflected in the transmission mask, which is searched, may be hidden inside noise. With more measurements, the noise is averaged, and the pattern of adjacent channel transmission becomes more noticeable. After both steps 906 and 908, operation continues to step 910. There, a weighted correlation of the averaged energies value is calculated for two patterns for adjacent channels on the left side or on the right side. These patterns are the expected reflection of adjacent channel transmission as observed in the main channel. The weighting is set based on the energy value of pattern. High energy zones have more weight than low energy zones. The closer the energy gets to the noise floor, the higher is the error. Hence higher errors at low energy zone should have the same impact as high errors in high energy zone. The correlation is performed with the expected shape (pattern) of the adjacent channel as illustrated in FIG. 7. A clear decline in the energy is expected, where the highest energy is next to the transmitting adjacent channel. The correlation has two values: pre-energy calibration and post-energy calibration. The value pre-energy calibration indicates the energy of the signal, while the value post-energy calibration indicates its resemblance to the expected pattern. The correlation level of the pattern, meaning post-energy calibration, is checked in step 912. If high, for example 99% certainty that this is an adjacent channel signal, then operation continues to step 916, where adjacent channel CCA is asserted. Otherwise, operation continues to step 914, where CCA is de-asserted. Both steps 914 and 916 continue to end 918.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the present application.

What is claimed is:

1. A method, comprising: in a vehicle-to everything (V2X) communication unit:
   a) detecting energy of an adjacent channel, the adjacent channel being adjacent to a main channel; and
   b) if adjacent channel energy is detected, deferring transmission in the main channel to maintain a sufficient communication range for both the main channel and the adjacent channel, and if the detection of the adjacent channel energy is false, then the deferring transmission in the main channel includes skipping a backoff scheme upon end of the false detection of the adjacent channel.

2. The method of claim 1, wherein the main channel and the adjacent channel are Dedicated Short Range Communication (DSRC) channels.

3. The method of claim 1, wherein the main channel is a Dedicated Short Range Communication (DSRC) channel and the adjacent channel is a C-V2X channel.

4. The method of claim 1, wherein the detecting energy of an adjacent channel includes using a filter bank used to estimate energy at different frequencies within the main channel based on time sample inputs, and using the estimated energy at different frequencies to detect the adjacent channel energy.

* * * * *